Figure 1:
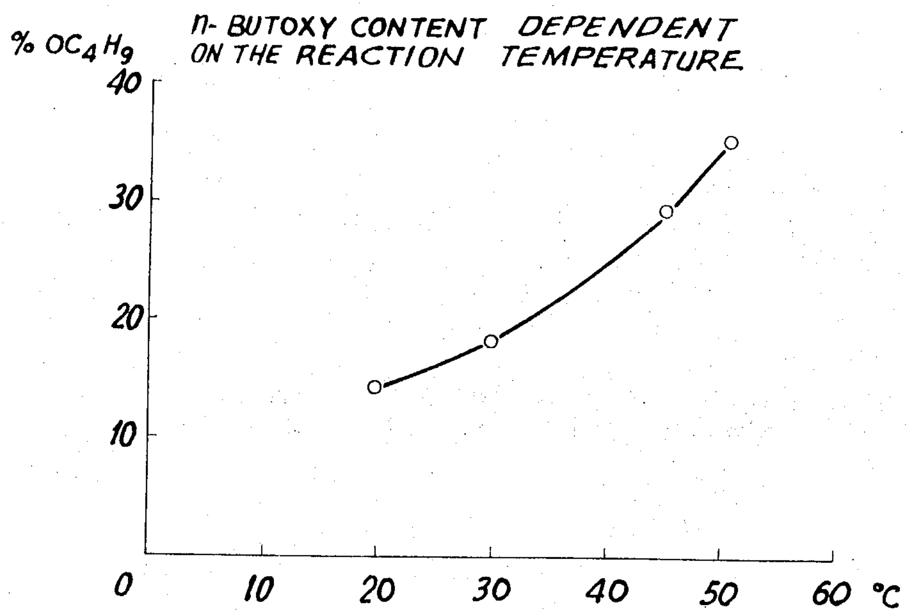
Figure 2:
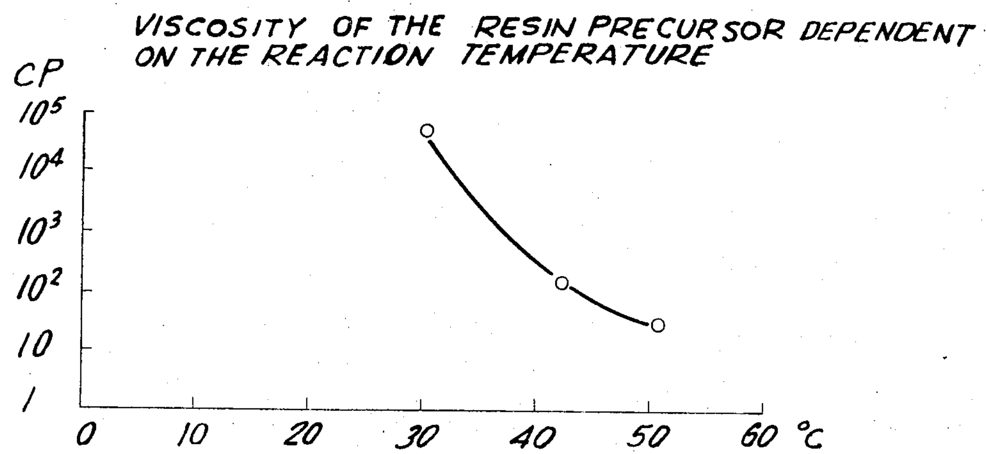

United States Patent [19]

Koerner et al.

[11] 3,725,339

[45] Apr. 3, 1973

[54] PROCESS OF REACTING A HALOGEN-SILANE MIXTURE WITH AN ALCOHOL MIXTURE CONTAINING TERTIARY ALCOHOL

[75] Inventors: Gotz Koerner; Vaclav Kropac, both of Essen; Gerd Rossmy, Essen-Werden, all of Germany

[73] Assignee: Th. Goldschmidt AG, Essen, Germany

[22] Filed: Mar. 26, 1971

[21] Appl. No.: 128,464

[30] Foreign Application Priority Data

Apr. 25, 1970 Germany....................P 20 20 224.8

[52] U.S. Cl. ....260/46.5 R, 117/135.1, 260/33.6 SB, 260/448.2 R, 260/448.2 E

[51] Int. Cl. ..............................................C08f 11/04

[58] Field of Search.....260/448.8 R, 46.5 R, 448.2 E

[56] References Cited

UNITED STATES PATENTS

| | | | |
|---|---|---|---|
| 2,389,477 | 11/1945 | Wright et al. | 260/46.5 |
| 3,260,699 | 7/1966 | Schmidt | 260/46.5 |
| 3,389,121 | 6/1968 | Burzynski et al. | 260/46.5 |
| 3,428,706 | 2/1969 | Jasinski et al. | 260/82.5 |
| 3,450,672 | 6/1969 | Merrill | 260/46.5 |
| 3,489,782 | 1/1970 | Pruvost et al. | 260/448.2 |

*Primary Examiner*—Donald E. Czaja
*Assistant Examiner*—Melvyn I. Marquis
*Attorney*—Toren & McGeady

[57] ABSTRACT

Silicone resin having a ratio of R : Si-groups of 0.95 to 1.5, the remaining Si-valences being satisfied by oxygen and alkoxy groups, the maximum amount of alkoxy groups being up to 0.75 mole of alkoxy per 100 g. R stands for methyl and/or (phenyl. 20 mole percent of the methyl and/or phenyl groups may be replaced by vinyl.

The silicone resin is produced by reacting a halogen silane mixture of an R : Si-ratio of 0.95 to 1.5 with a mixture consisting of a. tertiary, chain-like aliphatic alcohols of 4 to 8 carbon atoms, and b. primary and/or secondary chain-like aliphatic alcohols of 1 to 8, preferably 1 to 4 carbon atoms.

0.4 to 0.6 mole of tertiary alcohol are used per mole of silicon-attached halogen atom while 0.15 to 1 mole of primary and/or secondary alcohol are used per mole of tertiary alcohol. The reaction is effected at temperatures of between about 10° to 90°C. The reaction product may be subsequently further condensed.

6 Claims, 1 Drawing Figure

INVENTORS
GÖTZ KOERNER
VÁCLAV KROPÁČ
GERD ROSSMY
BY Toren & McGeady
ATTORNEYS

PROCESS OF REACTING A HALOGEN-SILANE MIXTURE WITH AN ALCOHOL MIXTURE CONTAINING TERTIARY ALCOHOL

FIELD OF INVENTION

The invention is concerned with a silicone resin having an R : Si-group ratio of from 0.95 to 1.5, the remaining Si-valences being satisfied by oxygen and alkoxy groups. The alkoxy groups may be present in amounts up to 0.75 mole of alkoxy per 100 g. R stands for methyl and/or phenyl. Up to 20 mole percent of the methyl and/or phenyl groups may be replaced by vinyl.

BACKGROUND INFORMATION AND PRIOR ART

Silicone resins with an R : Si-ratio of 0.95 to 1.5 are known. In these known resins, R usually stands for methyl and/or phenyl. The methyl, however, may be replaced by other lower aliphatic hydrocarbons or by unsaturated groups, such as for example, vinyl.

With a view to obtaining resins with the desired R : Si-group ratio, corresponding mixtures of halogen silanes were reacted pursuant to different processes in such a manner that the halogen atoms were split off, and one SiOSi-grouping replaced two SiX-groups.

Examples for such silane mixtures are, for example, mixtures of methyltrichlorosilane and dimethyldichlorosilane. The mixtures may moreover contain small amounts of trimethylchlorosilane. As stated above, the methyl can be replaced by other inert groups. Phenyl is a preferred group of this kind. Silicontetrachloride may be used as an additional silane which, due to its high functionality particularly facilitates the cross-linking. For this reason it is used in relatively small amounts only.

According to the state of the art, these silane mixtures may be reacted in different ways to form the desired silicone resins. The oldest method which, however, is still the most used one, is the cohydrolysis of the silane mixture with water. This hydrolysis has been described, for example, by W. Noll "Chemie und Technologie der Silicone", Verlag Chemie, Second Edition 1968, page 164 and following.

This procedure, however, has a number of drawbacks of which insufficient reproducibility is the most serious one. Further, the elasticity of the final resins and their temperature stability are unsatisfactory. It should also be mentioned that the volume yield is very low.

It has also been suggested to effect the reaction of the silane mixture to obtain silicone resins with tertiary alcohols. This reaction has been described, for example, in W. Noll supra, page 173. The halide corresponding to the tertiary alcohol is liberated in this reaction. However, also this reaction has several disadvantages. Thus, it is known that the reaction referred to often times results in gel-like products which are not usable as resins. If resins are formed, then they usually possess insufficient temperature stability and elasticity.

German Auslegeschrift 1 042 895 discloses a reaction according to which silane mixtures are reacted with tertiary aliphatic alcohols and water. However, the procedure disclosed in the German Auslegeschrift is limited to a very narrow field which is not concerned with resin-like products but rather oil-like substances. The process disclosed in the German Auslegeschrift is not usable for the production of resins.

SUMMARY OF THE INVENTION

It is a primary object of the present invention to propose a silicone resin which overcomes the disadvantages of the prior art as referred to above, which has superior temperature resistance and can withstand high temperatures for long periods of time.

Another object of the invention is to propose a silicone resin of the indicated kind which has excellent lacquer-technical characteristics.

A still further object of the invention is to find a process for the preparation of silicone resins of the indicated kind which operates with excellent volume yield and which is characterized by high reproducibility and variability.

Generally, it is an object of the invention to improve on the art of silicone resins as presently practiced.

Briefly, and in accordance with the invention it has surprisingly been found that the above objects are superiorly achieved if the silicone resin of the indicated kind is prepared by reaction of a halogen-silane-mixture having an R : Si-group ratio of 0.95 to 1.5 with a mixture essentially consisting of a. tertiary chain-like aliphatic alcohol with 4 to 8 carbon atoms, and b. primary and/or secondary chain-like aliphatic alcohols with 1 to 8, preferably 1 to 4 carbon atoms.

0.4 to 0.6 mole of tertiary alcohol are used for each mole of silicon-attached halogen atom while 0.15 to 1 mole of primary and/or secondary alcohol are employed for each mole of tertiary alcohol. The reaction is carried out at temperatures of between about 10° to 90°C, preferably 20° to 40°C. The reaction product obtained may be post-condensed in known manner.

The customary halogen silane mixtures may be used for the inventive reaction. Chlorosilane mixtures are preferred.

In respect to the tertiary chain-like aliphatic alcohols with 4 to 8 carbon atoms, particularly the tertiary butyl alcohol is preferred. However, tertiary amyl alcohol is also eminently suitable for the inventive purposes.

In respect to the primary chain-like aliphatic alcohols, both chain-like linear as well as branched aliphatic alcohols are suitable. Particularly recommended are methanol, ethanol, n-propanol, n-butanol, n-octanol and i-butanol. In respect to secondary alcohols, i-propanol and secondary butanol are particularly suitable.

The reaction proceeds at relatively low temperatures. As a general rule, the reaction may be carried out at temperatures of about between 20° to 40°C. Generally, temperatures of between about 10° to 90°C may be used. By varying the temperature, the synthesis may be varied in a desired manner. At higher temperatures, resin precursors of decreasing viscosity and increasing SiOR-contents are obtained. If desired, the reaction can be performed in the presence of inert solvents like toluene or xylene.

The primary reaction product thus obtained may, if desired, be subjected to a subsequent condensation. Such postcondensation is disclosed, for example, in U.S. Pat. No. 2,389,477 and is advantageously carried out at temperatures of from 50° to 120°C. A number of catalysts are known for these condensation reactions, as for example, Lewis-acids, such as $FeCl_3$ or $FeCl_3 \cdot 6H_2O$, boric acid ester, titanic acid ester, zirconium acid ester, $ZnCl_2$, $BCl_3$, acids, such as HCl, amines and ammonium compounds, such as for example, tetramethylguanidine-2-ethylcapronate or n-hexylamine-2-ethylcapronate. All these compounds are suitable as catalysts for the condensation reaction. However, $FeCl_3 \cdot 6H_2O$ is particularly suitable for the indicated purpose.

The invention will now be described by several examples, it being understood that these examples are given by way of illustration and not by way of limitation, and that many changes may be effected without affecting the scope and spirit of the invention as recited in the appended claims.

The following examples describe the production of the inventive resins. Moreover comparison tests between an inventive resin and two silicone resins as available on the market and having the same R : Si-ratio and the same meaning for R were carried out.

EXAMPLE 1

A mixture consisting of 360 parts by weight of tertiary butanol and 200 parts by weight of n-butanol is slowly added in dropwise manner and under stirring to a mixture of 394 parts by weight of methyltrichlorosilane and 54 parts by weight of dimethyldichlorosilane. The addition of the first-mentioned mixture took about 2 to 3 hours and was effected at temperatures ranging from between 22° to 26°C. After the entire butanol mixture had been added, the agitation was continued for 30 minutes, and subsequently tertiary butyl chloride and unreacted n- and tertiary butanol were removed by distillation. The liquid 100 percent resin precursor obtained was dissolved in xylene to obtain a 50 percent solution. The solution of 50 percent concentration does not contain any hydrolyzable chlorine, has a viscosity of 10 cP and contains 15 percent of n-butoxy-groups attached to silicon (calculated on polysiloxane).

150 g of a solution of the resin precursor of 33 percent concentration were condensed with 0.3 g of $FeCl_3 \cdot 6H_2O$ for 2 hours at a temperature of 90°C. The resin solution is washed with water, and by removal of a portion of the solvent by distillation, a solution of 50 percent concentration was produced. The viscosity of the final product amounted to 50 cP at 20°C.

Sheet metal was then coated with the resin, and the coated sheet metal was fired for two hours at 200°C. In this manner, very hard and elastic lacquer films were obtained which exhibited excellent heat stability. The following Table indicates some of the values which were measured in respect to the lacquer film in comparison with other commercially available resins whose $CH_3$ : Si-ratio is the same. The commercially available resins are indicated in the Table with I and II.

| | Aging time at 200° (in hours) | Resin of Example 1 | Resin I | Resin II |
|---|---|---|---|---|
| Surface hardness | 2 | 8 H | 4 H | 3 H |
| | 10 | 8 H | 6 H | 7 H |
| | 100 | 9 H | 8 H | 9 H |
| | 300 | 9 H | 9 H | 9 H |
| | 1000 | 9 H | films destroyed after 350 hours | |
| Adhesion on support | 2 | Gt 0 | Gt 0 | Gt 0 |
| | 10 | Gt 0 | Gt 1 | Gt 1 |
| | 100 | Gt 0 | Gt 2 | Gt 2 |
| +) | 300 | Gt 0 | Gt 4 | Gt 4 |
| | 1000 | Gt 0 | | |
| Elasticity | 2 | 9.5 | 8.1 | 7.8 |
| | 10 | 9.5 | 7.3 | 6.0 |
| ++) | 100 | 9.5 | 4.8 | 2.6 |
| | 300 | 9.5 | 1.8 | 0.7 |
| | 1000 | 9.5 | | |

+) The adhesion on the support was determined by the ruling technique test of the coating according to DIN 53151. Gt 0 means very good adhesion while Gt 4 indicates poor adhesion.

++) The elasticity was determined according to the Erichsen-test pursuant to DIN 53 156. The value 0 indicates a very brittle resin while the value 9.5 is the maximum value which can be obtained under the prevailing test conditions. At this point, the sheet tore.

EXAMPLE 2

According to the procedure disclosed in Example 1, a mixture consisting of 63 parts by weight of phenyltrichlorosilane, 45 parts by weight of dimethyldichlorosilane and 52 parts by weight of methyltrichlorosilane were hydrolyzed with the aid of a mixture of 108 parts by weight of tertiary butanol and 61 parts by weight of secondary butanol. The hydrolysate is condensed according to one of the known procedures, and a resin is obtained which is particularly suitable as a heat-stable insulating resin.

EXAMPLE 3

According to the procedure disclosed in Example 1, a mixture of 95 parts by weight of phenyltrichlorosilane, 58 parts by weight of dimethyldichlorosilane and 22.5 parts by weight of methyltrichlorosilane is hydrolyzed with the aid of a mixture of 128 parts by weight of tertiary amyl alcohol and 56 parts by weight of ethanol. The hydrolysate is also condensed according to one of the customary procedures, and a resin is obtained which is particularly suitable as an electroinsulating resin having high heat stability.

EXAMPLE 4

According to the procedure disclosed in Example 1, a mixture of 114 parts by weight of phenyltrichlorosilane, 176 parts by weight of dimethyldichlorosilane, 132 parts by weight of methyltrichlorosilane and 18 parts by weight of tetrachlorosilane is hydrolyzed with the aid of a mixture of 310 parts by weight of tertiary butanol and 112 parts by weight of methanol. The hydrolysate is also condensed according to one of the customary processes, and a resin is obtained which is particularly suitable for use as a laminating resin.

EXAMPLE 5

Four tests were performed in a manner analogous to Example 1. The same chlorosilane mixtures were used in these tests. The reaction temperatures, however, were 20°, 30°, 45° and 52°C, respectively. 100 percent products were obtained whose viscosity and n-butoxy-content are tabulated in the following Table and the diagram of FIG. 1.

| Test | Temperature during hydrolysis °C | 100% Product viscosity cP (20°C) | $n-C_4H_9O-$ weight-% |
|---|---|---|---|
| 1 | 20 | no longer measurable | 14.0 |
| 2 | 30 | 61,600 | 18.1 |
| 3 | 45 | 190.5 | 29.4 |
| 4 | 52 | 44.3 | 35 |

EXAMPLE 6

According to the procedure disclosed in Example 1, a mixture of 720 parts by weight of methyltrichlorosilane and 93 parts by weight of dimethylchlorosilane is hydrolyzed with the aid of a mixture of 460 parts by weight of tertiary butanol and 46 parts by weight ethanol. The obtained solventfree product has a viscosity of 1100 cP and contains 16 percent ethoxy groups attached to Si.

What is claimed is:

1. A process for producing a silicone resin precursor having a ratio of R : Si-groups of from 0.95 to 1.5, wherein the remaining Si-valences are satisfied by oxygen and alkoxy groups and wherein the maximum amount of alkoxy groups is 0.75 mole of alkoxy per 100 g of resin and wherein R stands for methyl and/or phenyl, which comprises reacting a halogen silane mixture having an R : Si-group ratio of from 0.95 to 1.5 with a mixture consisting essentially of a. a tertiary chain-like aliphatic alcohol with 4 to 8 carbon atoms and b. a primary and/or secondary chain-like aliphatic alcohol with 1 to 8 carbon atoms, the amount of tertiary alcohol in said mixture being 0.4 to 0.6 mole per mole of silicon-attached halogen atom while the amount of primary and/or secondary alcohol in the mixture is 0.15 to 1 mole per mole of tertiary alcohol, said reaction being carried out at a temperature of about between 10° to 90°C.

2. A process as claimed in claim 1, wherein up to 20 mole percent of said methyl and/or phenyl groups are replaced by vinyl.

3. A process as claimed in claim 1, wherein said primary and/or secondary aliphatic alcohol (b) has 1 to 4 carbon atoms.

4. A process as claimed in claim 1, wherein the reaction is carried out at a temperature of about between 20° to 40°C.

5. A process as claimed in claim 1, wherein the silicone precursor is subsequently condensed at temperatures ranging between about 50°–120°C in the presence of a catalyst, said catalyst being an acid, an amine or an ammonium compound.

6. A process as claimed in claim 5, wherein said acid is a Lewis acid.

* * * * *